Patented Feb. 18, 1936

2,030,901

UNITED STATES PATENT OFFICE 2,030,901

PROCESS FOR DEPOLYMERIZING ALPHA SUBSTITUTED ACRYLIC ACID ESTERS

Daniel E. Strain, Wilmington, Del., assignor to Du Pont Viscoloid Company, Wilmington, Del., a corporation of Delaware No Drawing. Application January 10, 1935, Serial No. 1,155

13 Claims. (Cl. 260—106)

This invention relates to a depolymerization process and, more particularly, to a method of producing a monomeric ester of alpha substituted acrylic acid from the corresponding polymeric ester.

The use of polymeric esters of alpha substituted acrylic acids for various purposes in the coating and plastic arts is known. In the use of such material there is inevitably a certain amount of scrap polymerized resin which will be wasted if it cannot be reduced to the monomeric form. This is particularly true of the resins which are used in the various turnery processes. To be able to recover monomeric ester from such scrap material is of great importance in the economical processing of these polymeric esters.

Heretofore it has been known in the art that polymeric methyl acrylate cannot be depolymerized by dry distillation, the first fraction from such distillation allegedly consisting of dimer, the second fraction trimer, and so on. Investigations have also shown that such polymeric substances as polymeric alkyl acrylates generally and even polymethacrylic acid cannot be depolymerized by dry distillation to give the corresponding monomeric compound.

An object of the present invention is to provide a simple and economical method of producing the monomeric esters of alpha substituted acrylic acid from the corresponding polymers. A further object is to provide a method for recovering monomeric ester of alpha substituted acrylic acid from scrap pieces of the corresponding polymer such as may accumulate in the production of articles from the polymer, particularly in the production of articles by turnery processes.

The above objects are accomplished according to the present invention by heating a polymeric ester of alpha substituted acrylic acid at a temperature above its decomposition point and condensing the vapors resulting therefrom. In a practical specific embodiment, the polymeric ester is heated at substantially atmospheric pressure to a temperature substantially above its decomposition point, the vapors resulting from such distillation are condensed, and the condensate is fractionally distilled to recover the monomeric ester in substantially pure form.

The following examples are given to illustrate specific embodiments of the invention. In these examples the polymeric ester is subjected to what is commonly known as "dry distillation."

Example 1.—70 grams of methyl methacrylate polymer were placed in a one liter distilling flask fitted with a thermometer and a water condenser, and subjected to dry distillation over a free flame. 68 grams of liquid condensate were collected and fractionated, from which 62 grams of methyl methacrylate monomer were obtained. The monomeric methyl methacrylate so collected, polymerized to a solid resin when heated for 15 minutes at 100° C. in the presence of 1% benzoyl peroxide.

Example 2.—16 grams of n-butyl methacrylate polymer were heated as in Example 1 and 15.5 grams of distillate collected, from which 12 grams of n-butyl methocrylate monomer were obtained. This material polymerized to a solid resin when heated for 35 minutes at 100° C. in the presence of 1% benzoyl peroxide.

Example 3.—9½ grams of ethylene glycol dimethacrylate were heated as in Example 1, and 7.5 grams of liquid condensate were collected. Upon fractional distillation 6 grams of monomeric ethylene glycol dimethacrylate were obtained. This material readily polymerized when heated at 100° C. in the presence of 1% benzoyl peroxide.

Example 4.—Polymeric butoxyethoxyethyl methacrylate is dry distilled as in Example 1 and the monomer obtained by fractionally distilling. This monomer has a boiling point of 116° C. at 4 mm. pressure and is readily polymerized by heating at 65° C. for 48 hours in the presence of benzoyl peroxide.

Example 5.—Polymeric stearyl methacrylate is dry distilled as in Example 1 and the condensate fractionally distilled to recover the monomer. This monomer has a melting point of 28–29° C. and is readily polymerized by heating at 65° C. for 2 days in the presence of benzoyl peroxide.

In any of the above examples the process of polymerization and depolymerization may be repeated any number of times without adversely affecting the polymerizing qualities of the monomer.

It is to be understood that the above examples are merely illustrative and that by heating any polymeric ester of alpha substituted acrylic acid at a temperature above its decomposition point the corresponding monomeric ester may be obtained. Among the esters of this class may be mentioned the following: beta-chloroethyl methacrylate, o-cresyl methacrylate, p-cyclohexyl phenyl methacrylate, decahydro beta-naphthyl methacrylate, decamethylene glycol dimethacrylate, beta-diethyl amino-ethyl methacrylate, diethylene glycol dimethacrylate, diisopropyl carbinol methacrylate, glycol monomethacrylate, furfuryl methacrylate, isobutyl methacrylate, lauryl methacrylate, methyl allyl methacrylate, naphthenyl methacrylate, oleyl methacrylate, beta-phenylethyl methacrylate, resorcinol dimethacrylate, secondary-butyl methacrylate, tetrahydrofurfuryl methacrylate, tertiary-butyl methacrylate, glycol di(alpha-butylacrylate), benzyl ethacrylate, ethyl-alpha-phenylacrylate, methyl-α-isopropylacrylate, methyl-α-heptylacrylate, methyl-α-methylphenylacrylate, ethyl-α- methylcyclohexylacrylate, and propyl-α-cyclohexylacrylate. The above mentioned esters fully illustrate the applicability of the present invention to the class of polymerized esters of alpha substituted acrylic acid, including the alpha alkyl substituted, alpha aryl substituted, and alpha aralkyl substituted acrylic acids.

While, in the examples given above, only simple dry distillation of the polymeric ester at substantially atmospheric pressure is illustrated, the present method may be carried out at elevated pressures to effect heat-cracking prior to distillation. Also, the dry distillation may be carried out at reduced pressures, if desired. Instead of distilling as shown in the examples, so-called "flash distillation" may be employed where the polymeric ester is slowly introduced on to a highly heated surface and instantly vaporized. Variations in specific details of the dry distillation, condensation, and fractional distillation to recover the monomer in substantially pure form will occur to those skilled in the art. As will be understood, the polymeric material must be heated to a temperature above its decomposition point at the pressure employed and, generally, for economical operation, the material should be heated appreciably above such decomposition point. Specific temperatures employed must, necessarily, be governed by the particular polymer being depolymerized. Ordinarily the vapors of the monomeric compound will be condensed but, if desired, the vapors may be used directly with some other reactant.

The present process is useful for the recovery of monomeric ester from the corresponding polymer regardless of its source. The process is particularly useful for the recovery of scrap resin in the turnery processes where waste from scrap constitutes a major production cost item. However, the process also finds utility in the recovery of monomer either from poor quality polymer or accidentally set up material, as well as from polymer of any other source.

The fact that the monomer can be recovered by dry distillation of the polymeric esters herein disclosed is most unexpected in view of the behavior of such closely related compounds as polymeric alkyl acrylates and polymethacrylic acid. Despite the fact that the polymeric alkyl acrylates and polymethacrylic acid cannot be dry distilled to recover the corresponding monomer, yet the present process is applicable to the whole class of polymeric esters of alpha substituted acrylic acid as far as can be ascertained from the behavior of the esters herein disclosed.

As many apparently widely different embodiments of this invention may be made without departing from the spirit and scope thereof, it is to be understood that the invention is not limited to the specific embodiments thereof except as defined in the appended claims.

I claim:

1. Method of producing a monomeric ester of an acrylic acid substituted in the alpha position by a hydrocarbon radical which comprises heating the corresponding polymeric ester at a temperature above its decomposition point.

2. Method of producing a monomeric ester of an acrylic acid substituted in the alpha position by a hydrocarbon radical which comprises heating the corresponding polymeric ester at a temperature above its decomposition point and condensing the vapors resulting therefrom.

3. Method of producing a monomeric ester of an acrylic acid substituted in the alpha position by a hydrocarbon radical which comprises heating the corresponding polymeric ester at a temperature above its decomposition point, condensing the vapors resulting therefrom, and fractionally distilling the condensate to recover the monomeric ester in substantially pure form.

4. Method of producing a monomeric ester of alpha alkyl substituted acrylic acid comprising heating the corresponding polymeric ester at a temperature above its decomposition point and condensing the vapors resulting therefrom.

5. Method of producing a monomeric alkyl ester of alpha alkyl substituted acrylic acid comprising heating the corresponding polymeric ester at a temperature above its decomposition point and condensing the vapors resulting therefrom.

6. Method of producing a monomeric ester of methacrylic acid comprising heating the corresponding polymeric ester at a temperature above its decomposition point and condensing the vapors resulting therefrom.

7. Method of producing monomeric methyl methacrylate comprising heating the corresponding polymeric ester at a temperature above its decomposition point and condensing the vapors resulting therefrom.

8. Method of producing monomeric methyl methacrylate comprising heating the corresponding polymeric ester at a temperature above its decomposition point, condensing the vapors resulting therefrom, and fractionally distilling the condensate to recover the monomeric ester in substantially pure form.

9. Method of producing a monomeric ester of alpha aryl substituted acrylic acid comprising heating the corresponding polymeric ester at a temperature above its decomposition point and condensing the vapors resulting therefrom.

10. Method of producing a monomeric ester of alpha aralkyl substituted acrylic acid comprising heating the corresponding polymeric ester at a temperature above its decomposition point and condensing the vapors resulting therefrom.

11. Method of producing a monomeric ester of an acrylic acid substituted in the alpha position by a hydrocarbon radical which comprises heating the corresponding polymeric ester at substantially atmospheric pressure and at a temperature above its decomposition point, condensing the vapors resulting therefrom, and fractionally distilling the condensate to recover the monomeric ester in substantially pure form.

12. Method of producing monomeric methyl methacrylate comprising heating the corresponding polymeric ester at substantially atmospheric pressure and at a temperature above its decomposition point, condensing the vapors resulting therefrom, and fractionally distilling the condensate to recover the monomeric methyl methacrylate in substantially pure form.

13. Method of producing a monomeric ester of an acrylic acid substituted in the alpha position by a hydrocarbon radical which comprises heating the corresponding polymeric ester under reduced pressure and at a temperature above its decomposition point, and condensing the vapors resulting therefrom.

DANIEL E. STRAIN.